(12) United States Patent
Ahmed et al.

(10) Patent No.: US 10,805,789 B2
(45) Date of Patent: Oct. 13, 2020

(54) METHOD AND APPARATUS FOR DOWNLOADING A PROFILE FOR REMOTELY PROVISIONING A SUBSCRIBER ENTITY

(71) Applicant: Telefonaktiebolaget LM Ericsson (publ), Stockholm (SE)

(72) Inventors: Abu Shohel Ahmed, Espoo (FI); Patrik Salmela, Espoo (FI); Kazi Wali Ullah, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/314,957

(22) PCT Filed: Jul. 18, 2016

(86) PCT No.: PCT/EP2016/067029
§ 371 (c)(1),
(2) Date: Jan. 3, 2019

(87) PCT Pub. No.: WO2018/014930
PCT Pub. Date: Jan. 25, 2018

(65) Prior Publication Data
US 2019/0313241 A1 Oct. 10, 2019

(51) Int. Cl.
*H04W 8/20* (2009.01)
*H04W 12/06* (2009.01)
(Continued)

(52) U.S. Cl.
CPC ......... *H04W 8/205* (2013.01); *H04L 63/0823* (2013.01); *H04W 12/00* (2013.01);
(Continued)

(58) Field of Classification Search
CPC ......... H04W 8/20; H04W 8/18; H04W 8/183; H04W 8/186; H04W 8/22; H04W 8/245;
(Continued)

(56) References Cited

U.S. PATENT DOCUMENTS 9,425,844 B2 * 8/2016 Babbage et al. ..... H04B 1/3816
9,867,037 B2 * 1/2018 Caceres et al. ......... H04W 8/24
(Continued)

FOREIGN PATENT DOCUMENTS

WO 03061246 A1 7/2003
WO 2011115407 A2 9/2011

OTHER PUBLICATIONS

GSM Association, "RSP Technical Specification", Version 1.0, pp. 1-114, Jan. 13, 2016, SGP.22-RSP, GMSA.
(Continued)

*Primary Examiner* — Meless N Zewdu
(74) *Attorney, Agent, or Firm* — Sage Patent Group

(57) ABSTRACT

There is provided mechanisms for remote provision of a subscriber entity. The method is performed by the subscriber entity. A method comprises providing a request for download of a profile for remote provisioning of the subscriber entity to a subscription management entity. The method comprises verifying, using a profile handling unit of the subscriber entity, that the subscription management entity possesses a valid certificate for downloading the profile. The method comprises allowing download of the profile for remote provisioning of the subscriber entity only when the subscription management entity possesses the valid certificate.

15 Claims, 4 Drawing Sheets

(51) Int. Cl.
*H04W 12/00* (2009.01)
*H04L 29/06* (2006.01)

(52) U.S. Cl.
CPC ....... *H04W 12/0023* (2019.01); *H04W 12/06* (2013.01); *H04W 12/0609* (2019.01)

(58) Field of Classification Search
CPC . H04W 8/205; H04W 12/00; H04W 12/0023; H04W 12/0609; H04W 12/06; H04W 88/02; H04W 88/08; H04W 4/50; H04W 4/60; H04W 8/04; H04W 12/00514; H04W 12/004; H04W 12/00409; H04W 12/002; H04W 12/0027; H04W 12/08; H04W 12/0806; H04W 4/70; H04W 88/00; H04W 28/0846; H04W 12/10; H04W 12/04; H04W 12/00403; H04W 12/003; H04W 12/0605; H04W 12/0804; H04L 29/08117; H04L 67/06; H04L 67/30; H04L 67/303; H04L 67/306; H04L 63/0823; H04L 9/006; G06F 9/4451; G06F 16/437

See application file for complete search history.

(56) References Cited

U.S. PATENT DOCUMENTS

| | | | |
|---|---|---|---|
| 10,045,177 B2* | 8/2018 | Park et al. | H04W 4/70 |
| 10,111,089 B2* | 10/2018 | Park et al. | H04W 12/04 |
| 10,114,629 B2* | 10/2018 | Gao | G06F 8/61 |
| 2010/0268926 A1* | 10/2010 | Zhang | 713/2 |
| 2011/0167263 A1 | 7/2011 | Cross et al. | |
| 2013/0160147 A1* | 6/2013 | Draluk et al. | 726/30 |
| 2014/0219447 A1 | 8/2014 | Park et al. | |
| 2014/0287725 A1* | 9/2014 | Lee | H04W 12/06 |
| 2016/0057624 A1* | 2/2016 | Yang et al. | H04W 12/06 |
| 2016/0127132 A1 | 5/2016 | Lee et al. | |
| 2016/0277394 A1* | 9/2016 | Berthet | H04L 63/0853 |
| 2016/0295407 A1* | 10/2016 | Hur et al. | H04W 12/04 |
| 2016/0301529 A1* | 10/2016 | Park et al. | H04L 9/30 |
| 2016/0330608 A1* | 11/2016 | Benn | H04W 8/183 |
| 2017/0064552 A1* | 3/2017 | Park et al. | H04W 12/06 |
| 2018/0302781 A1* | 10/2018 | Lee et al. | H04W 8/20 |
| 2019/0053040 A1* | 2/2019 | Long | H04W 8/205 |
| 2019/0230087 A1* | 7/2019 | Gharout et al. | H04L 63/101 |

OTHER PUBLICATIONS

GSM Association, "Embedded SIM Remote Provisioning Architecture", Version 1.1, pp. 1-84, Dec. 17, 2013, Official Document 12FAST.13, GMSA.

Park, J. et al., "Secure Profile Provisioning Architecture for Embedded UICC", 2013 International Conference on Availability, Reliability and Security, Sep. 2, 2013, pp. 297-303, IEEE.

Office Action dated Aug. 7, 2020 for EP Patent Application No. 16745073.3, 6 pages.

* cited by examiner

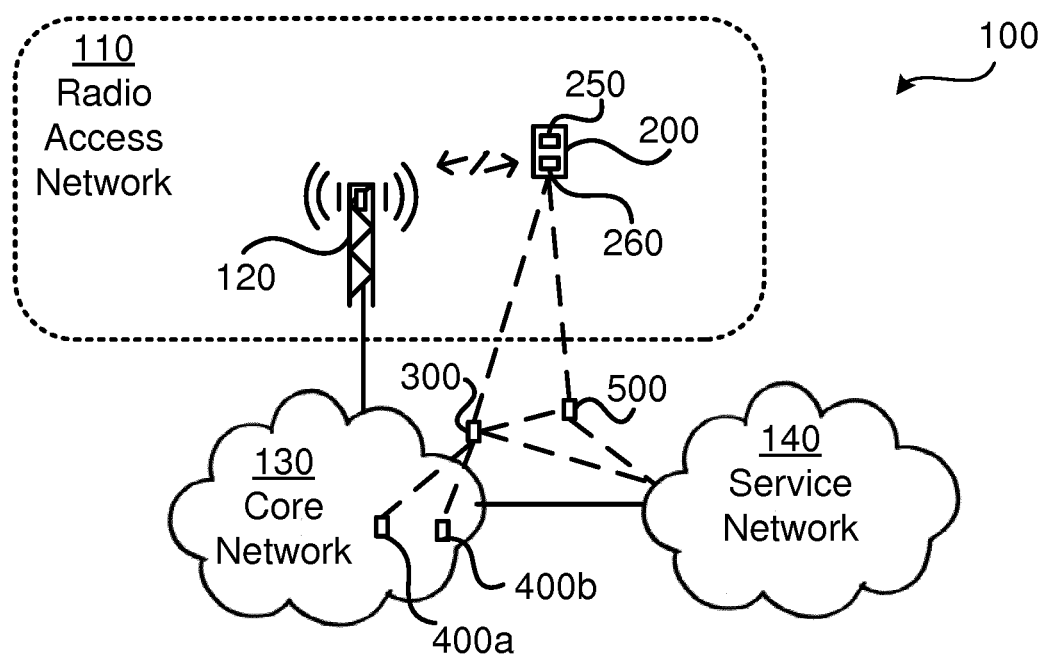
Fig. 1
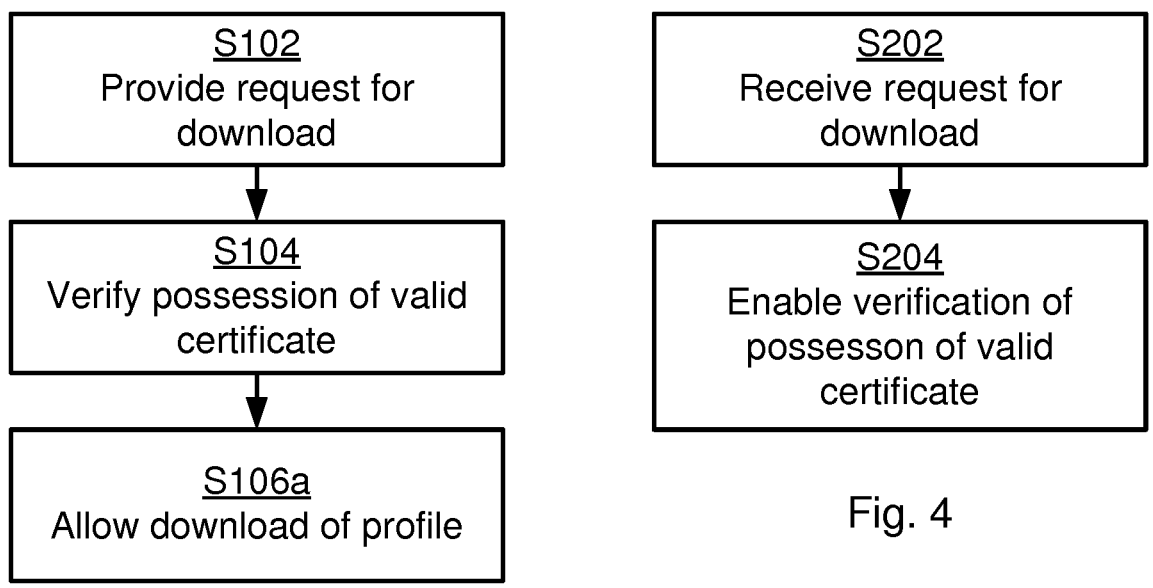
Fig. 2
Fig. 4

METHOD AND APPARATUS FOR DOWNLOADING A PROFILE FOR REMOTELY PROVISIONING A SUBSCRIBER ENTITY

TECHNICAL FIELD

Embodiments presented herein relate to methods, a subscriber entity, a subscription management entity, computer programs, and a computer program product for remote provision of a subscriber entity.

BACKGROUND

Mobile networks are being used to connect all sorts of devices; automated reading of utility meters, intelligent connectivity of cars and commercial vehicles to enable drivers to access navigation, infotainment or breakdown services, traffic lights, home security and assisted living.

A subscriber identity module or subscriber identification module (SIM) is an integrated circuit chip that is intended to securely store the international mobile subscriber identity (IMSI) number and its related key, as well as other information relevant for the subscription, which is used to identify and authenticate subscriptions on the devices. The SIM circuit is part of the function of a Universal Integrated Circuit Card (UICC) physical smart card. Traditional SIM cards are predicated on only associating with one network operator.

The GSM Association (GSMA), where GSM is short for Global System for Mobile communications, has released a technical specification denoted SGP.22—RSP defining remote SIM provisioning for consumer devices and a technical specification denoted SGP.02 disclosing a remote provisioning architecture for Embedded UICC (eUICC), which targets machine-to-machine (M2M) type communications devices. In short, the operator uses an entity called SM-DP+/SM-DP (short for Subscription Management-Data Preparation) for creation of SIM profiles that are later installed from the SM-DP/SM-DP+ to the eUICC. For the consumer devices, the profile is installed through a Local Profile Assistant (LPA) on the consumer device to the Issuer Security Domain Profile (ISD-P) on the eUICC in the device. For the M2M devices, the SM-DP installs the profile via a separate (external) entity, SM-SR, to the ISD-P on the device.

Both above mentioned variants have the device owner obtaining a subscription for the device from the operator by providing the operator with relevant information about the device to be provisioned, optionally including eUICC ID (EID) and International Mobile Station Equipment Identity (IMEI). The subscription can be obtained from a point of sales, via a web page of the operator, or other similar methods. Section 3.1 in SGP.22 describes the profile download initiation process. It shows how the user orders a subscription from the operator, and how the operator asks the SM-DP+ to generate the matching profile. Then the operator provides the user with an activation code (AC) that the user can insert into/provide to the device to be provisioned. The device can extract the relevant information (SM-DP+ reachability information, etc.) from the activation code and then proceed to contact the SM-DP+ for downloading the profile based on the AC after mutual authentication and various security functions.

The above referred technical specification documents suggest that the device to be provisioned (denoted companion device) can be managed through a primary device (e.g., a User Equipment), which can e.g. provide global connectivity (through e.g. WiFi tethering) to the device to be provisioned and act as the input device for entering e.g. the activation code of the device to be provisioned. The technical specification SGP.22 also defines a GetEID function that can be used for retrieving the EID of the device to be provisioned.

The process of ordering the subscription/profile from the operator comprises the user to provide billing information and optionally the EID, and/or the IMEI. Billing information implies providing identification and authentication of the user as well as possibly providing other billing related information such as the address and a credit card number of the user.

In some countries, mobile network operators (MNOs) sell subscriptions with subsidy; MNOs sell subsidized UEs to earn money from subscriptions. This requires the MNOs to lock the UEs with a specific MNO. Existing mechanisms for locking UEs with a specific MNO include firmware lock by the device manufacturer to lock the UE to a particular network. Users of the UE could then need to enter a specific sequence of digits (code) to unlock the UE. However, there are multiple known ways to break this lock mechanism.

Hence, there is still a need for improved mechanisms for remote provision of devices.

SUMMARY

An object of embodiments herein is to provide efficient remote provision of devices.

According to a first aspect there is presented a method for remote provision of a subscriber entity. The method is performed by the subscriber entity. The method comprises providing a request for download of a profile for remote provisioning of the subscriber entity to a subscription management entity. The method comprises verifying, using a profile handling unit of the subscriber entity, that the subscription management entity possesses a valid certificate for downloading the profile. The method comprises allowing download of the profile for remote provisioning of the subscriber entity only when the subscription management entity possesses the valid certificate.

According to a second aspect there is presented a subscriber entity for remote provision of the subscriber entity. The subscriber entity comprises processing circuitry. The processing circuitry is configured to cause the subscriber entity to provide a request for download of a profile for remote provisioning of the subscriber entity to a subscription management entity. The processing circuitry is configured to cause the subscriber entity to verify, using a profile handling unit of an eUICC of the subscriber entity, that the subscription management entity possesses a valid certificate for downloading the profile. The processing circuitry is configured to cause the subscriber entity to allow download of the profile for remote provisioning of the subscriber entity only when the subscription management entity possesses the valid certificate.

According to a third aspect there is presented a subscriber entity for remote provision of the subscriber entity. The subscriber entity comprises processing circuitry and a computer program product. The computer program product stores instructions that, when executed by the processing circuit, causes the subscriber entity to perform operations, or steps. The operations, or steps, cause the subscriber entity to provide a request for download of a profile for remote provisioning of the subscriber entity to a subscription management entity. The operations, or steps, cause the subscriber entity to verify, using a profile handling unit of the subscriber entity, that the subscription management entity possesses a valid certificate for downloading the profile. The operations, or steps, cause the subscriber entity to allow download of the profile for remote provisioning of the subscriber entity only when the subscription management entity possesses the valid certificate.

According to a fourth aspect there is presented a subscriber entity for remote provision of the subscriber entity. The subscriber entity comprises a provide module configured to provide a request for download of a profile for remote provisioning of the subscriber entity to a subscription management entity. The subscriber entity comprises a verify module configured to verify, using a profile handling unit of the subscriber entity, that the subscription management entity possesses a valid certificate for downloading the profile. The subscriber entity comprises an allow module configured to allow download of the profile for remote provisioning of the subscriber entity only when the subscription management entity possesses the valid certificate.

According to a fifth aspect there is presented a computer program for remote provision of a subscriber entity, the computer program comprising computer program code which, when run on processing circuitry of the subscriber entity, causes the subscriber entity to perform a method according to the first aspect.

According to a sixth aspect there is presented a method for remote provision of a subscriber entity. The method is performed by a subscription management entity. The method comprises receiving a request for download of a profile for remote provisioning of the subscriber entity from the subscriber entity. The method comprises enabling a profile handling unit of the subscriber entity to verify that the subscription management entity possesses a valid certificate for downloading the profile.

According to a seventh aspect there is presented a subscription management entity for remote provision of a subscriber entity. The subscription management entity comprises processing circuitry. The processing circuitry is configured to cause the subscription management entity to receive a request for download of a profile for remote provisioning of the subscriber entity from the subscriber entity. The processing circuitry is configured to cause the subscription management entity to enable a profile handling unit of the subscriber entity to verify that the subscription management entity possesses a valid certificate for downloading the profile.

According to an eighth aspect there is presented a subscription management entity for remote provision of a subscriber entity. The subscription management entity comprises processing circuitry and a computer program product. The computer program product stores instructions that, when executed by the processing circuit, causes the subscription management entity to perform operations, or steps. The operations, or steps, cause the subscription management entity to receive a request for download of a profile for remote provisioning of the subscriber entity from the subscriber entity. The operations, or steps, cause the subscription management entity to enable a profile handling unit of the subscriber entity to verify that the subscription management entity possesses a valid certificate for downloading the profile.

According to a ninth aspect there is presented a subscription management entity for remote provision of a subscriber entity. The subscription management entity comprises a receive module configured to receive a request for download of a profile for remote provisioning of the subscriber entity from the subscriber entity. The subscription management entity comprises an enable module configured to enable a profile handling unit of the subscriber entity to verify that the subscription management entity possesses a valid certificate for downloading the profile.

According to a tenth aspect there is presented a computer program for remote provision of a subscriber entity, the computer program comprising computer program code which, when run on processing circuitry of a subscription management entity, causes the subscription management entity to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium can be a non-transitory computer readable storage medium.

Advantageously these methods, these subscriber entities, these subscription management entities, and these computer programs provide efficient remote provision of the secondary subscriber entity.

Advantageously these methods, these subscriber entities, these subscription management entities, and these computer programs enable a lock-in mechanism of the eUICC towards an MNO (via the subscription management entity), which allows the MNO to control subscriber migration behavior of the eUICC.

Advantageously these methods, these subscriber entities, these subscription management entities, and these computer programs enable the possibility to provide implicit operator lock-in.

Advantageously these methods, these subscriber entities, these subscription management entities, and these computer programs provide control of profile download to the eUICC.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 is a schematic diagram illustrating a communication network according to embodiments;

FIGS. 2, 3, 4, and 5 are flowcharts of methods according to embodiments;

DETAILED DESCRIPTION

Figure 5:
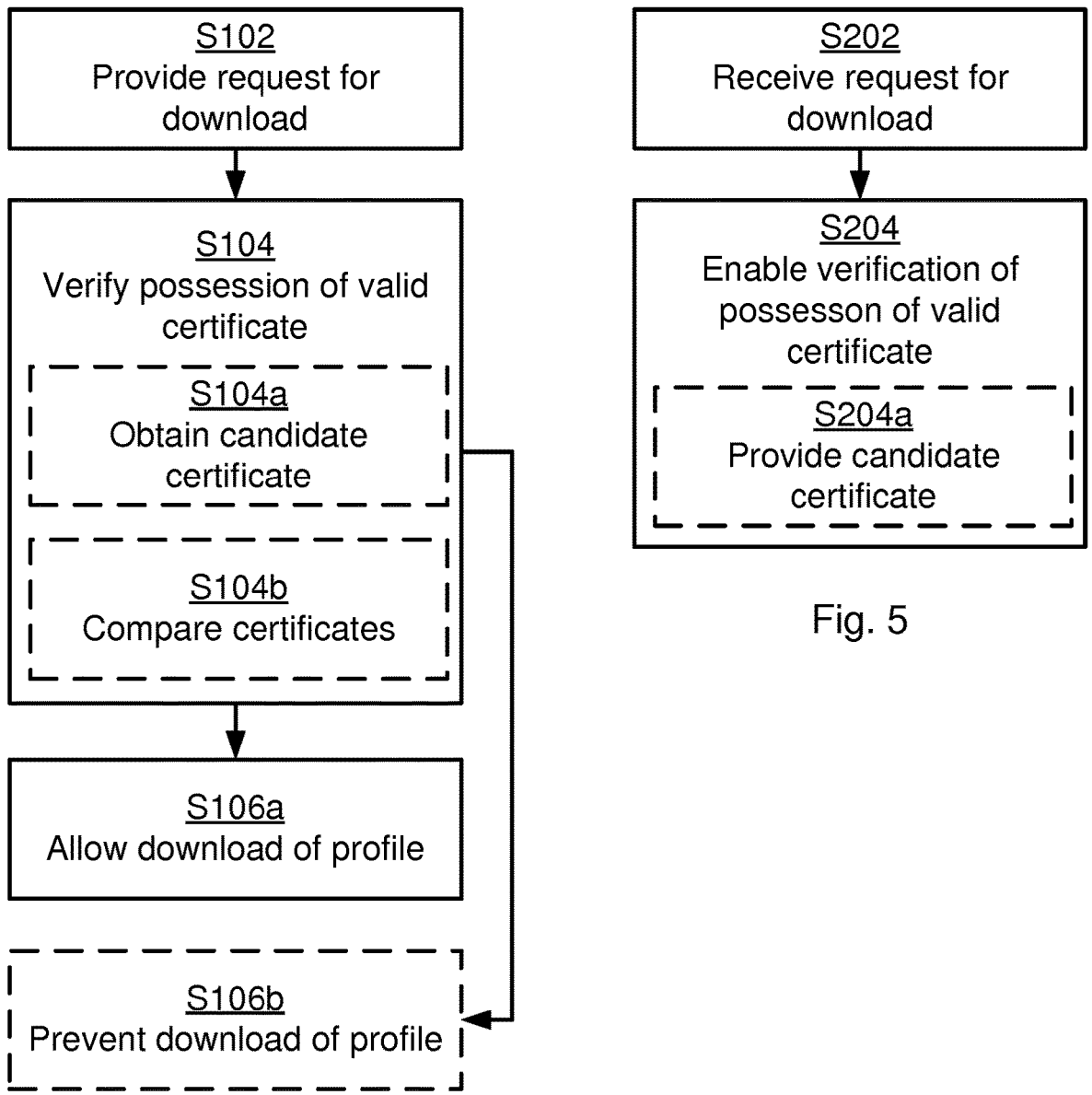

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

FIG. 1 is a schematic simplified diagram of a communications network 100 where embodiments presented herein can be applied. The communications network 100 comprises a radio access network 110 (defined by a radio access network node 120, such as a radio base station), a core network 130, and a packet based service network 140. The core network 130 operatively connects the radio access network 110 with the packet based service network 140.

A subscriber entity 200 operatively connected to the packet based service network 140110, for example via radio access network node 120, via WiFi, or via some other wireless or fixed wired access, is thereby enabled to access services and exchange data with the service network 140.

The subscriber entity 200 comprises a profile handling unit, which could be provided as an Issuer Security Domain Root (ISD-R) function 250, or just ISD-R for short, and an Embedded Universal Integrated Circuit Card (eUICC) 260. According to some aspects the ISD-R 250 is provided within the eUICC 260.

The communications network 100 is operated by one or more mobile network operators (MNO), schematically illustrated at reference numerals 400a, 400b.

The communications network 100 further comprises at least one subscription management entity 300. The subscription management entity 300 could be located in the core network 130, in the service network 140, or outside the core network 130 and the service network 140; the herein disclosed embodiments are not limited to any particular location of the subscription management entity 300. Each such subscription management entity 300 could be implemented in an SM-DP+ entity. Functionality of the subscription management entity 300 in relation to the herein disclosed embodiments will be disclosed below.

The communications network 100 further comprises a Certificate Issuer (CI) 500. Functionality of the CI 500 in relation to the herein disclosed embodiments will be disclosed below.

Dashed lines in FIG. 1 indicate operational connections.

The embodiments disclosed herein relate to mechanisms for remote provision of the subscriber entity 200. In order to obtain such mechanisms there is provided a subscriber entity 200, a method performed by the subscriber entity 200, a computer program product comprising code, for example in the form of a computer program, that when run on processing circuitry of the subscriber entity 200, causes the subscriber entity 200 to perform the method. In order to obtain such mechanisms there is further provided a subscription management entity 300, a method performed by the subscription management entity 300, and a computer program product comprising code, for example in the form of a computer program, that when run on processing circuitry of the subscription management entity 300, causes the subscription management entity 300 to perform the method.

Existing mechanisms for remote provision of the subscriber entity 200 can cater the requirement of downloading a SIM profile to the eUICC 260 with which it has a trust relationship. The trust relationship is established by placing the CI's 500 public key in the eUICC 260, typically during manufacturing of the eUICC 260. Any subscription management entity 300 which obtains a certificate from the CI 500 can download the profile to the target eUICC 260. However, based on current practices, there are requirement to control which subscription management entity 300 can download profile to the eUICC 260. This can be a requirement for cases when the MNO 400a, 400b sells devices with subsidy and wants to control subscriber migration. Existing mechanisms for remote provision of the subscriber entity 200 do not define the explicit eUICC ownership role by means of a lock-in mechanism of a subscription management entity 300. Only the CI 500 controls the trust chain and all of the trusted subscription management entities 300 can download profiles to the eUICC 260. The herein disclosed embodiments enable a lock-in mechanism of the eUICC 260 to be used for a particular subscription management entity 300 or even to profiles of a specific MNO via a specific particular subscription management entity 300.

Before describing the herein disclosed embodiments some general aspects of remote provisioning of a subscriber entity 200 will be disclosed. In general terms, remote provisioning provides the facility to remotely download a profile in the eUICC 260. The security (i.e., trust) association between the subscription management entity 300 and the eUICC 260 is defined by the CI 500 acting as a trust anchor. Only the trusted (as signed by the CI 500) subscription management entity 300 can send profile towards the eUICC 260. The security association is based on initial trust anchor (PK.CI.ECDSA) placed in the eUICC 260 by the eUICC manufacturer (EUM). Any subscription management entity 300 which later on certifies itself with the CI 500 of the eUICC manufacturer is allowed to download profiles to the eUICC 260. With this setup, the CI 500 of the eUICC manufacturer controls which entity may or may not download a profile to the eUICC 260. However, it could be required to control eUICC profile download (including which profiles can be downloaded) by only an MNO-controlled/restricted (or third party) subscription management entity 300.

Hereinafter will be disclosed mechanisms to control eUICC profile download by an owner (i.e., a specific) subscription management entity 300. This is achieved by introducing necessary enforcement mechanisms in the eUICC 260. The owner subscription management entity 300 controls which subscription management entity or entities that can download a profile to the eUICC 260. This allows a subscription management entity 300 to become owner of the eUICC 260. These modifications enhance the role of the existing subscription management entity 300 (implemented as an SM-DP+) and introduces new functionality in the ISD-R entity 250 of the eUICC 260.

Assume there is an eUICC manufacturer A having manufactured eUICCs denoted eUICC.A1, eUICC.A2, and so on. Assume further that CI.A is the public key trusted by all eUICC's from manufacturer A. At bootstrapping time, subscription management entity A, by default, is trusted by the CI.A, i.e., CI.A signs certificate of subscription management entity A. Thus, initially, there is a trust relationship between eUICCs of manufacturer A and subscription management entity A. Assume further that a subscriber entity with eUICC.A requests to download a profile of mobile network operator MNO.1. MNO.1 could operate an own subscription management entity or it could use the existing subscription management entity 300 of the eUICC Manufacturer or other trusted subscription management entity (via the subscription management entity having a CI issued certificate) to download the profile to the target eUICC.A. In case the subscription management entity 300 serves only one MNO (hereinafter exemplified by MNO1), the eUICC 260 identifies and authenticates the subscription management entity 300 (and thus implicitly also MNO.1) using the subscription management entity.A certificate.

To achieve ownership by the subscription management entity 300, the certificate/identity of the subscription management entity 300 is added to a whitelist in the ISD-R 250 of the eUICC 260. When a new profile download process is executed between the subscription management entity 300 and an eUICC 260, the subscription management entity's 300 certificate/identity is matched against the whitelist in the eUICC 260 and a download is only permitted if the subscription management entity 300 is whitelisted in the eUICC 260. Next a typical scenario will be described.

The eUICC 260 during profile download verifies that the subscription management entity 300 possesses a certificate issued by a trusted CI. The ISD-R 250 can further verify that the certificate/identity of the subscription management entity 300 is whitelisted in the profile handling unit 250, 260, i.e. that the subscription management entity 300 is allowed to download a profile to the eUICC 260. In case the subscription management entity 300 serves more than one MNO (hereinafter exemplified by MNO.1 and MNO.2) locking the eUICC 260 and/or ISD-R 250 to only allowing profiles from one subscription management entity 300 (to only allow profiles from a specific subscription management entity 300 regardless of which operator profile is used) does not lock the eUICC 260 to one MNO and thus do not achieve operator lock-in. The subscription management entity 300 could therefore generate MNO-specific certificates (and corresponding keys) for itself by using its CI issued certificate/keys to sign MNO specific certificates for itself.

During profile download the subscription management entity 300 could thus use an MNO.1 subscription management entity.A certificate. An enforcement function can verify the identity of MNO.1 using the existing subscription management entity.A certificate chain (certificate chain: the MNO.1 subscription management entity.A certificate is signed by the subscription management entity A). In this respect the eUICC 260 and/or ISD-R 250 may just know that the identity of MNO.1 is a sub-identity of a trusted subscription management entity 300. This means that the ISD-R 250 has a lock to the MNO.1 subscription management entity.A certificate compared to the above case where the lock is to the subscription management entity.A certificate.

In scenarios where one subscription management entity 300 serves multiple MNOs 400a, 400b, the subscription management entity 300 generates MNO-specific subscription management certificates, which it signs with the certificate it has received from the CI 500. This creates a certificate chain, starting with the CI 500 and ending with the MNO-specific subscription management certificate. Now, when communicating with the eUICCs 260, the subscription management entity 300 uses the profile specific certificate (i.e., the MNO specific subscription management certificate for the MNO 400a, 400b that requested the profile to be created) towards the eUICC 260 so that the ISD-R 250 on the eUICC 260 can enforce operator lock-in. The MNO-specific subscription management certificate does not have to identify the operator; it is enough that the subscription management entity 300 uses the same, MNO-specific, certificate for all profile downloads for the same MNO 400a, 400b.

In order for the ISD-R 250 and/or the eUICC 260 to be able to verify in case multiple MNOs 400a, 400b use the same subscription management entity 300, that the profile to be downloaded is from the correct MNO 400a, 400b the subscription management entity 300 could be made aware that lock-in is in use by the subscriber entity 200. This can be achieved by storing this information in a Device Information post (see, the technical specification SGP.22, 4.2). The Device Information could contain a capability called "boot-lock" variable, which can be either TRUE or FALSE or the identity of the entity to which it is locked (such as subscription management entity.A) or its certificate, or a pointer to this certificate, or other identifying information. In the profile download sequence, as described in the technical specification SGP.22 3.1.2, this information can be communicated from the LPA to the subscription management entity 300 (SM-DP+ in the technical specification SGP.22) in step 6. The Device Information is available to the LPA, which can include this part of the information in the message of step 6. In this way, the subscription management entity 300 knows that the subscriber entity 200 is locked-in and that the subscription management entity 300 needs to consider this. If the subscription management entity 300 is only serving one MNO, it can use the CI issued certificate for the rest of the communication as specified in the technical specification SGP.22. I.e., the lock-in, used or not, does not require any additional steps or logic for the subscription management entity 300.

However, if the subscription management entity 300 is serving multiple MNOs 400a, 400b, the subscription management entity 300 needs to authenticate to the ISD-R 250 and/or eUICC 260 using a "sub-certificate" allocated for the MNO 400a, 400b providing the profile to be downloaded. In general terms, to be able to identify the MNO 400a, 400b, and thus the certificate to be used, the subscription management entity 300 needs to know which profile will be requested by the subscriber entity 200 to be downloaded and which MNO has issued it. The profile could be identified by a MatchingID/AC_Token, which is part of the activation code that triggered the download process at the eUICC 260. Thus, in addition to a boot_lock information, the LPA needs to include in step 6 (or in step and or step 12) of technical specification SGP.22 the MatchingID/AC_Token parsed from the activation code. The subscription management entity 300 can once it knows that lock-in (boot_lock) is in use, use the received MatcingID/AC_Token for identifying the profile and thus also the MNO 400a, 400b, which in turn gives the MNO-specific subscription management sub-certificate to be used. Thus, the subscription management entity 300, based on this information, uses the appropriate sub-certificate in the rest of the download flow as specified in technical specification SGP.22 3.1.2. The subscription management entity 300 could store this information in the download context, to later verify that the same MatchingID/ AC_Token is actually used at the actual download (step 13 in technical specification SGP.22 3.1.2).

Another way for the subscription management entity 300 to identify which MNO-specific certificate to use during profile download can be achieved by having a separate fully qualified domain names (FQDN s) for each MNO 400*a*, 400*b* for the same subscription management service. Thus, when MNO 400*a* (or subscription management entity 300) generates the activation code for a profile, downloadable from the subscription management entity 300, it uses an MNO-specific subscription management entity address (e.g. in the form mno1.smdp.com). When MNO 400*b*, also served by the same subscription management entity 300, generates an activation code for one of its profiles, it uses an MNO-specific subscription management address (e.g. in the form mno2.smdp.com). Thus, each eUICC 260 will connect to the subscription management entity 300 using an MNO-specific address/FQDN, which makes it possible for the subscription management entity 300 to identify which MNO-specific subscription management certificate to use towards the eUICCs 260. Both of these cases require subscription management entity enforcement at the eUICC level, specifically at the ISD-R 250, described below.

FIGS. 2 and 3 are flow charts illustrating embodiments of methods for remote provision of the subscriber entity 200 as performed by the subscriber entity 200. FIGS. 4 and 5 are flow charts illustrating embodiments of methods for remote provision of the subscriber entity 200 as performed by the subscription management entity 300. The methods are advantageously provided as computer programs 1120*a*, 1120*b*.

Reference is now made to FIG. 2 illustrating a method for remote provision of the subscriber entity 200 as performed by the subscriber entity 200 according to an embodiment.

The subscriber entity 200 is to be provisioned and therefore provides a request to the subscription management entity 300 by being configured to perform step S102:

S102: The subscriber entity 200 provides a request for download of a profile for remote provisioning of the subscriber entity 200 to the subscription management entity 300.

Not all management entities are allowed to provision the subscriber entity 200 and the subscriber entity 200 is therefore configured to perform step S104:

S104: The subscriber entity 200 verifies that the subscription management entity 300 possesses a valid certificate for downloading the profile. In this respect the verification is performed by the subscriber entity 200 using the profile handling unit 250, 260 of the subscriber entity 200. A valid certificate could herein be defined as a certificate that is whitelisted/allowed for profile download/installation on the subscriber entity 200. In this respect, subscriber entity 200 verifies that the certificate/identity provided by the subscription management entity 300 is stored in the profile handling unit 250, 260 (which could store multiple accepted certificates/identities). The subscriber entity 200 thus verifies that the subscription management entity 300 possesses a valid certificate matching a certificate marked as accepted in the eUICC 260 or has an identity matching and identity marked as accepted in the eUICC 260, a profile handling unit 250, or eSIM Certificate Authority Security Domain (ECASD) and hence that the subscription management entity 300 possesses a valid certificate for the profile download operation.

S106*a*: The subscriber entity 200 allows download of the profile for remote provisioning of the subscriber entity 200 only when the subscription management entity 300 possesses the valid certificate/identity.

This enables the subscriber entity 200 to control ownership (by means of a lock-in mechanism) of the eUICC 260 by the subscription management entity 300. Further, this enables the MNO 400*a* to control subscriber profile download from other MNOs 400*b*.

Embodiments relating to further details of remote provision of the subscriber entity 200 as performed by the subscriber entity 200 will now be disclosed.

As mentioned above, the subscription management entity 300 could be associated only with a single MNO 400*a*. In this case the certificate is specific for the subscription management entity 300. Alternatively, as also mentioned above, the subscription management entity 300 could be associated with at least two MNOs 400*a*, 400*b*. In this case the certificate is specific for less than all of the at least two MNOs 400*a*, 400*b*. That is, in this case the profile handling unit 250, 260 could have MNO-specific certificates verifiable by the CI 500 and installed during manufacturing of the eUICC 260 of the profile handling unit 250, 260.

In some aspects lock-in is enabled. Hence, according to an embodiment the verifying in step S104 is performed as a consequence of the eUICC 260 being locked to a particular set of MNOs 400*a*, and/or subscription management entities 300. According to an embodiment information that the eUICC 260 is locked to a particular set of MNOs 400*a*, and/or subscription management entities 300 is defined by a boot-lock variable having value True. Further, if the boot-lock variable has value True and if the certificate store in the profile handling unit 250, 260 is empty, then the incoming certificate owner (defined by the first subscription management entity 300 to successfully be used for downloading a profile to the eUICC 260) will become the owner of the eUICC 260 and the certificate is placed in the ISD-R 250. The information that the eUICC 260 is locked could be provided to the subscription management entity 300 in the request for download in step S102. Further, according to an embodiment the request for download comprises an activation code for provisioning of the subscriber entity 200. The activation code could comprise a direct address to a MNO-specific subscription management entity 300. In this way the subscription management entity 300 will from the request address know that the subscriber entity 200 wants to get a profile of the specified MNO and that the MNO-specific certificate should be used.

Reference is now made to FIG. 3 illustrating methods for remote provision of the subscriber entity 200 as performed by the subscriber entity 200 according to further embodiments. It is assumed that steps S102, S104, S106*a* are performed as described with reference to FIG. 2 and a thus repeated description thereof is therefore omitted.

There could be different ways for the subscriber entity 200 to perform the verifying in step S104. According to some aspects the verifying involves matching of certificates. Hence according to an embodiment the subscriber entity 200 is configured to perform steps S104*a* and S104*b* as part of step S104:

S104*a*: The subscriber entity 200 obtains a candidate certificate from the subscription management entity 300.

S104*b*: The subscriber entity 200 compares the candidate certificate to a list of reference certificates. The reference certificates could define which subscription management entities are allowed to install the profile on the eUICC 260. The list of reference certificates could thus define a whitelist of accepted certificates. The subscription management entity 300 is then determined to possess the valid certificate only when the candidate certificate matches one of the reference certificates. In addition the subscription management entity 300 could have to prove ownership of the candidate certificate by using a corresponding private key for authenticating itself. For example, a requirement could be that one of the reference certificates and the candidate certificate are signed by a common CI 500 such that both this one of the reference certificates and the candidate certificate contain the same public key and are both signed by the CI 500 trusted by the eUICC 260.

Download is prevented if the subscription management entity 300 does not possess the valid certificate. Hence according to an embodiment the subscriber entity 200 is configured to perform step S106b:

S106b: The subscriber entity 200 prevents download of the profile for remote provisioning of the subscriber entity 200 when the subscription management entity 300 does not possess the valid certificate.

Reference is now made to FIG. 4 illustrating a method for remote provision of the subscriber entity 200 as performed by the subscription management entity 300 according to an embodiment.

As disclosed above, the subscriber entity 200 in step S102 provides a request for download of a profile for remote provisioning of the subscriber entity 200 from the subscription management entity 300. Hence, the subscription management entity 300 is configured to perform step S202:

S202: The subscription management entity 300 receives a request for download of a profile for remote provisioning of the subscriber entity 200 from the subscriber entity 200.

The subscription management entity 300 is further configured to perform step S204:

S204: The subscription management entity 300 enables the profile handling unit 250, 260 of the subscriber entity 200 to verify that the subscription management entity 300 possesses a valid certificate for downloading the profile. Examples of what operations the subscription management entity 300 could perform to enables the profile handling unit 250, 260 of the subscriber entity 200 to perform such a verification will be disclosed below.

Embodiments relating to further details of remote provision of the subscriber entity 200 as performed by the subscription management entity 300 will now be disclosed.

As disclosed above, the subscription management entity 300 could be associated only with a single MNO 400a where the certificate is specific for the subscription management entity 300. Or, the subscription management entity 300 could be associated with at least two MNOs 400a, 400b where the certificate is specific for less than all of the at least two MNOs 400a, 400b.

As disclosed above, in some aspects lock-in in use is enabled and the request for download comprises information that the eUICC 260 is locked to a particular set of MNOs 400a, and/or subscription management entities 300. This information could be defined by a boot-lock variable having value True. Further, the FQDN used by the subscriber entity 200 when contacting the subscription management entity 300 could comprises information about which MNO profile the subscriber entity 200 requests. The use of an MNO-specific FQDN is a way to indicate that a specific MNO sub-certificate should be used, but it is also possible to add such an explicit indication by means of a boot-lock.

Reference is now made to FIG. 5 illustrating methods for remote provision of the subscriber entity 200 as performed by the subscription management entity 300 according to further embodiments. It is assumed that steps S202, S204 are performed as described with reference to FIG. 4 and a thus repeated description thereof is therefore omitted As disclosed above, according to some aspects the verifying performed by the subscriber entity 200 involves matching of certificates. Hence, according to an embodiment the subscription management entity 300 is configured to perform step S204a as part of step S204:

S204a: The subscription management entity 300 provides a candidate certificate to the subscriber entity 200 (for authenticating itself to the eUICC 260). The subscription management entity 300 is then determined to possess the valid certificate only when the candidate certificate matches a reference certificate of the subscriber entity 200 (as disclosed above with reference to step S104b).

Figure 6:
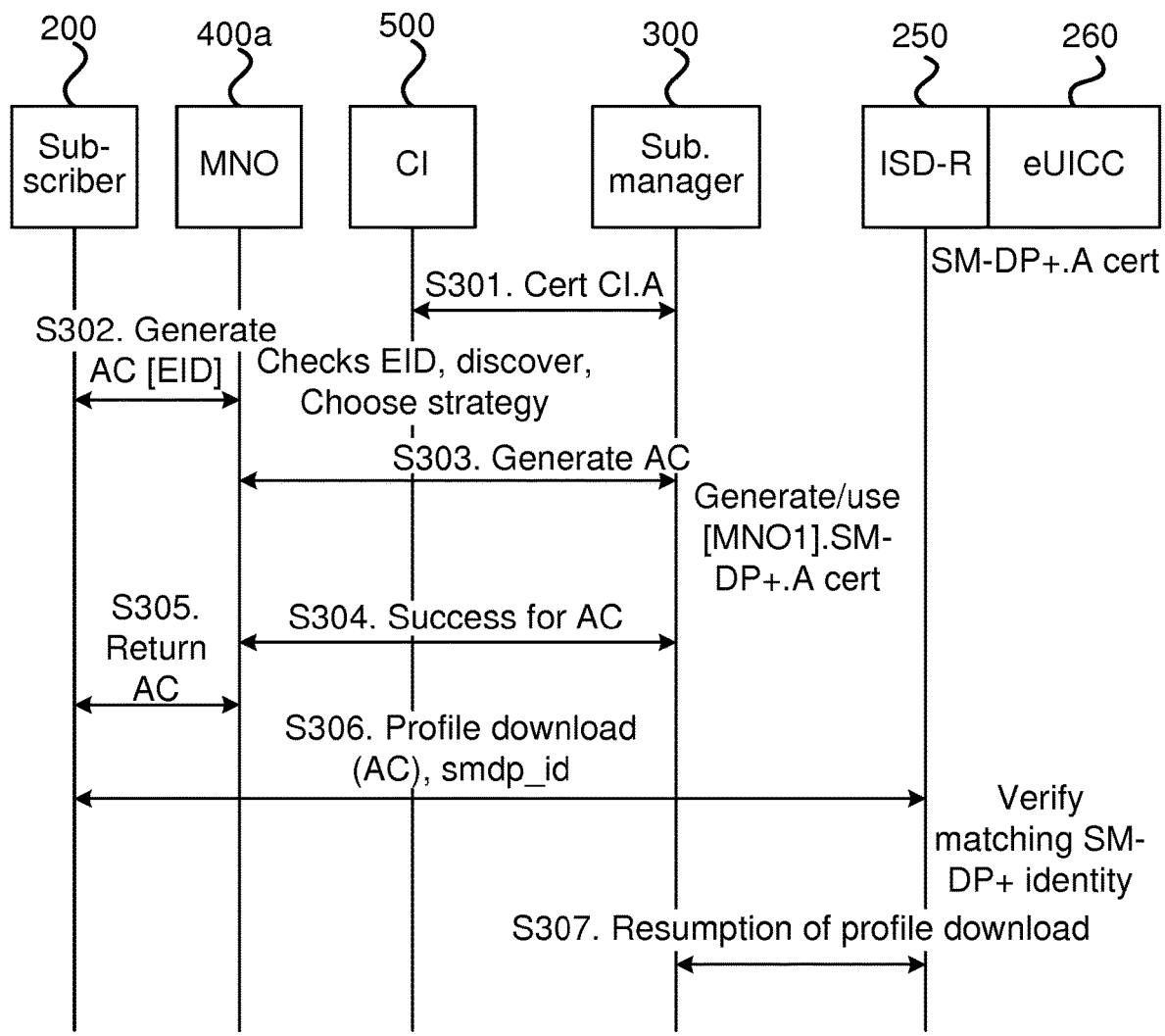
FIG. 6 is a signalling diagram according to embodiments.

One particular embodiment for remote provision of the subscriber entity 200 based on at least some of the above disclosed embodiments will now be disclosed in detail with reference to the signalling diagram of FIG. 6.

S301: Public key (PK.CI) of the eUICC manufacturer's CI 500 is embedded in the eUICC 260. In addition, a certificate and ID of an owner subscription management entity 300 is stored in the profile handling unit 250, 260, e.g. at the manufacturing. This defines the ownership of the eUICC 260 of the profile handling unit 250, 260 to the subscription management entity 300.

S302: The eUICC 260 requests to download a profile to the eUICC 260 from the MNO 400a. To perform this, the subscriber entity 200 contacts (optionally with its EID) the MNO 400a and requests a subscription and instructions regarding how to download the request and from which entity to download the profile from.

S303: The MNO 400a sends a profile generation request to the subscription management entity 300. The MNO 400 selects the appropriate subscription management entity 300 for the eUICC 260. Based on subscription management capability (i.e., whether or not the subscription management entity 300 support the certificate chain required for multiple MNOs as described above), the subscription management entity 300 can generate a new certificate e.g., a MNO1.SM-DP+.A certificate or it can use an existing SM-DP+.A certificate during the profile download process to the eUICC 260. In both cases, the trust chain starts from PK.CI. PK.CI is the root of trust and is installed in the eUICC 260; the CI 500 can then generate subscription management entity specific certificates for subscription management entitiess 300, which then can themselves generate the needed MNO-specific sub-certificates.

S304: The subscription management entity 300 optionally returns an activation code (AC) to the MNO 400a.

S305: The AC is returned to the subscriber entity 200. The AC optionally includes an MNO-specific FQDN.

S306: The subscriber entity 200 provides the AC to the eUICC 260 for the eUICC 260 to download the profile (the AC should include the address of the subscription management entity 300) which in turn initiates the profile download process. Profile download then follows the technical specification SGP.22 until step to as described in section 3.1.2. At this stage, a process as described below for ownership enforcement at eUICC is performed.

S307: After the certificate or identity of the subscription management entity 300 has been verified, the profile download then follows the technical specification SGP.22.

In step to, according to the technical specification SGP.22, the eUICC 206 shall verify the CERT.DP.ECDSA using PK.CI.ECDSA. In step S306 above the following steps are performed to check which owner subscription management entity 300 is allowed to download a profile to the subscriber entity 200:

The ISD-R 250 checks requesting subscription manager entity ID and certificate from the incoming request.

If boot_lock is true:
  check ISD-R certificate store (subscription manager entity-storage):
    if a certificate already exist:
      do nothing, and
    if no certificate exists in the store:
      place the incoming request certificate in store (after successful profile installation).

In the ISD-R 250:
  compare, if boot_lock has value True, requesting subscription manager entity ID and certificate with the previously stored subscription manager entity IDs and certificates.

If match (i.e., incoming request is signed by the existing owner subscription manager entity 300) between requesting subscription manager entity ID and previously stored owner subscription manager entity IDs:
  Continue profile download to the eUICC/ISD-P or SIM Card
  Else if mismatch between requesting subscription manager entity 300 and previously stored owner subscription manager entity:
  Return an error code, such as not sufficient permission to download.

In the case that the boot_lock functionality is enabled, but no subscription manager entity information is configured, the ISD-R 250 will store the ID and certificate of the first subscription manager entity 300 that is used to download and install a profile as the locked-in subscription manager entity information.

Figure 7:
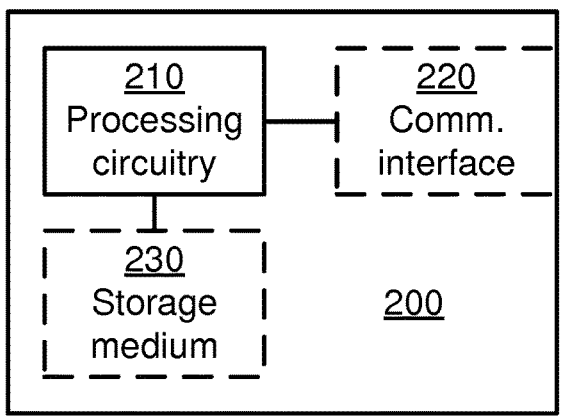
FIG. 7 is a schematic diagram showing functional units of a subscriber entity according to an embodiment.

FIG. 7 schematically illustrates, in terms of a number of functional units, the components of a subscriber entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the subscriber entity 200 to perform a set of operations, or steps, S102-S106, as disclosed above. For example, the storage medium 230 may store the set of operations, and the processing circuitry 210 may be configured to retrieve the set of operations from the storage medium 230 to cause the subscriber entity 200 perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The subscriber entity 200 may further comprise a communications interface 220 for communications. As such the communications interface 220 may comprise one or more transmitters and receivers, comprising analogue and digital components and a suitable number of antennas for wireless communications and ports for wireline communications.

The processing circuitry 210 controls the general operation of the subscriber entity 200 e.g. by sending data and control signals to the communications interface 220 and the storage medium 230, by receiving data and reports from the communications interface 220, and by retrieving data and instructions from the storage medium 230. Other components, as well as the related functionality, of the subscriber entity 200 are omitted in order not to obscure the concepts presented herein.

Figure 8:
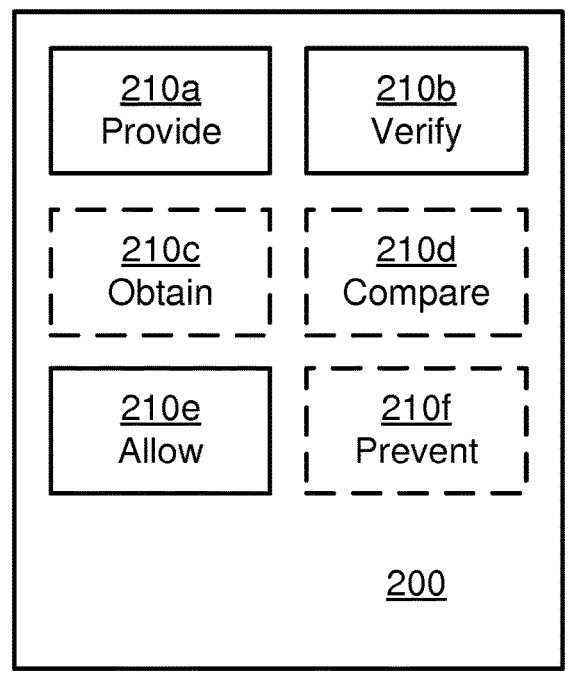
FIG. 8 is a schematic diagram showing functional modules of a subscriber entity according to an embodiment.

FIG. 8 schematically illustrates, in terms of a number of functional modules, the components of a subscriber entity 200 according to an embodiment. The subscriber entity 200 of FIG. 8 comprises a number of functional modules; a provide module 210a configured to perform step S102, a verify module 210b configured to perform step S104, and an allow module 210e configured to perform step S106a. The subscriber entity 200 of FIG. 8 may further comprise a number of optional functional modules, such as any of an obtain module 210C configured to perform step S104a, a compare module 210d configured to perform step S104b, and a prevent module 210f configured to perform step S106b. In general terms, each functional module 210a-210f may be implemented in hardware or in software. Preferably, one or more or all functional modules 210a-210f may be implemented by the processing circuitry 210, possibly in cooperation with functional units 220 and/or 230. The processing circuitry 210 may thus be arranged to from the storage medium 230 fetch instructions as provided by a functional module 210a-210f and to execute these instructions, thereby performing any steps of the subscriber entity 200 as disclosed herein.

Figure 9:
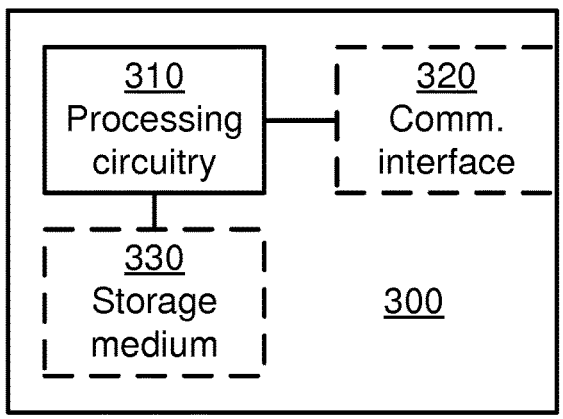
FIG. 9 is a schematic diagram showing functional units of a subscription management entity according to an embodiment.

FIG. 9 schematically illustrates, in terms of a number of functional units, the components of a subscription management entity 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110b (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the subscription management entity 300 to perform a set of operations, or steps, S202-S204, as disclosed above. For example, the storage medium 330 may store the set of operations, and the processing circuitry 310 may be configured to retrieve the set of operations from the storage medium 330 to cause the subscription management entity 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The subscription management entity 300 may further comprise a communications interface 320 for communications. As such the communications interface 320 may comprise one or more transmitters and receivers, comprising analogue and digital components and a suitable number of antennas for wireless communications and ports for wireline communications.

The processing circuitry 310 controls the general operation of the subscription management entity 300 e.g. by sending data and control signals to the communications interface 320 and the storage medium 330, by receiving data and reports from the communications interface 320, and by retrieving data and instructions from the storage medium 330. Other components, as well as the related functionality, of the subscription management entity 300 are omitted in order not to obscure the concepts presented herein.

Figure 10:
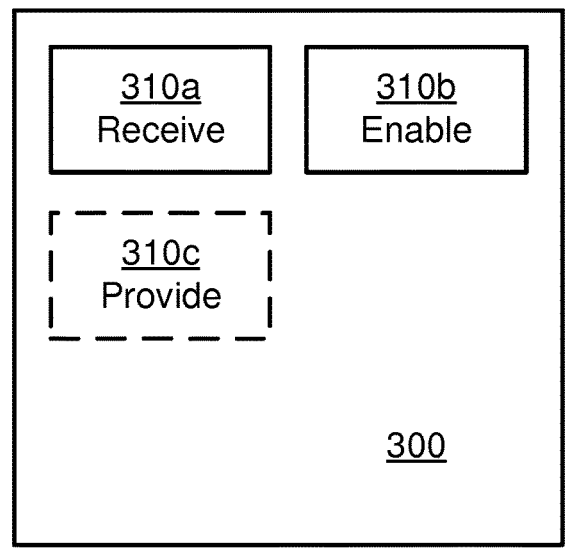
FIG. 10 is a schematic diagram showing functional modules of a subscription management entity according to an embodiment.

FIG. 10 schematically illustrates, in terms of a number of functional modules, the components of a subscription management entity 300 according to an embodiment. The subscription management entity 300 of FIG. 10 comprises a number of functional modules; a receive module 310a configured to perform step S202, and an enable module 310b configured to perform step S204. The subscription management entity 300 of FIG. 10 may further comprises a number of optional functional modules, such as a provide module 310c configured to perform step S204a. In general terms, each functional module 310a-310c may be implemented in hardware or in software. Preferably, one or more or all functional modules 310a-310c may be implemented by the processing circuitry 310, possibly in cooperation with functional units 320 and/or 330. The processing circuitry 310 may thus be arranged to from the storage medium 330 fetch instructions as provided by a functional module 310a-310c and to execute these instructions, thereby performing any steps of the subscription management entity 300 as disclosed herein.

The subscription management entity 300 may be provided as a standalone device or as a part of at least one further device. For example, the subscription management entity 300 may be provided in a node of the service network or in a node of the core network. Alternatively, functionality of the subscription management entity 300 may be distributed between at least two devices, or nodes. These at least two nodes, or devices, may either be part of the same network part (such as the service network or the core network) or may be spread between at least two such network parts.

Thus, a first portion of the instructions performed by the subscription management entity 300 may be executed in a first device, and a second portion of the of the instructions performed by the subscription management entity 300 may be executed in a second device; the herein disclosed embodiments are not limited to any particular number of devices on which the instructions performed by the subscription management entity 300 may be executed. Hence, the methods according to the herein disclosed embodiments are suitable to be performed by a subscription management entity 300 residing in a cloud computational environment. Therefore, although a single processing circuitry 310 is illustrated in FIG. 10 the processing circuitry 310 may be distributed among a plurality of devices, or nodes. The same applies to the functional modules 310a-310c of FIG. 10 and the computer program 1120b of FIG. 11 (see below).

Figure 11:
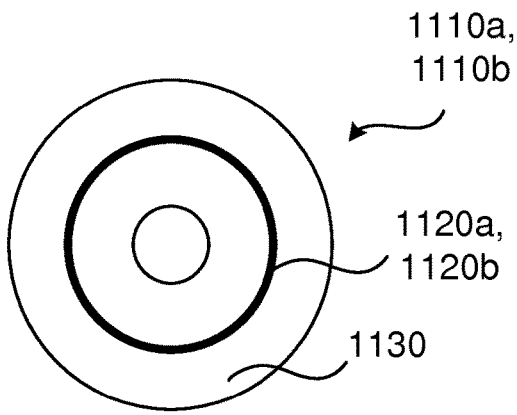
FIG. 11 shows one example of a computer program product comprising computer readable means according to an embodiment.

FIG. 11 shows one example of a computer program product 1110a, 1110b comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the subscriber entity 200 as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the subscription management entity 300 as herein disclosed.

In the example of FIG. 11, the computer program product 1110a, 1110b is illustrated as an optical disc, such as a CD (compact disc) or a DVD (digital versatile disc) or a Blu-Ray disc. The computer program product 1110a, 1110b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b is here schematically shown as a track on the depicted optical disk, the computer program 1120a, 1120b can be stored in any way which is suitable for the computer program product 1110a, 1110b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for remote provisioning of a subscriber entity, the method comprising the subscriber entity:
   providing a request for download of a profile for the remote provisioning of the subscriber entity to a subscription management entity;
   verifying, using a profile handling unit of the subscriber entity, that the subscription management entity possesses a valid certificate for downloading the profile,
   wherein the verifying is performed in response to an Embedded Universal Integrated Circuit Card (eUICC) in the subscriber entity being locked to a particular set of mobile network operators and/or subscription management entities,
   wherein information that the eUICC is locked to the particular set of mobile network operators and/or subscription management entities is defined by a boot-lock variable having value equal to True; and
   allowing the download of the profile for the remote provisioning of the subscriber entity only when the subscription management entity possesses the valid certificate.

2. The method of claim 1, wherein the verifying comprises:
   obtaining a candidate certificate from the subscription management entity; and
   comparing the candidate certificate to a list of reference certificates, wherein the subscription management entity is determined to possess the valid certificate only when the candidate certificate matches one of the reference certificates.

3. The method of claim 2, wherein the reference certificate and the candidate certificate are signed by a common Certificate Issuer.

4. The method of claim 2, wherein the list of reference certificates defines which subscription management entities are allowed to download and install the profile on the Embedded Universal Integrated Circuit Card (eUICC).

5. The method of claim 1, further comprising preventing the download of the profile for the remote provisioning of the subscriber entity when the subscription management entity does not possess the valid certificate.

6. The method of claim 1, wherein the subscription management entity is associated only with a single mobile network operator; and
wherein the certificate is specific for the subscription management entity.

7. The method of claim 1,
wherein the subscription management entity is associated with at least two mobile network operators (MNOs); and
wherein the certificate is specific for less than all of the at least two MNOs.

8. The method of claim 1, wherein the information is provided to the subscription management entity in the request for the download.

9. The method of claim 1,
wherein the request for the download comprises an activation code for provisioning of the subscriber entity; and
wherein the activation code comprises an address to the subscription management entity that identifies the mobile network operator providing the activation code.

10. A method for remote provisioning of a subscriber entity, the method comprising a subscription management entity:
receiving a request for download of a profile for remote provisioning of the subscriber entity from the subscriber entity; and
enabling a profile handling unit of the subscriber entity to verify that the subscription management entity possesses a valid certificate for downloading the profile,
wherein the request for the download comprises information that an Embedded Universal Integrated Circuit Card (eUICC) in the subscriber entity is locked to a particular set of mobile network operators and/or subscription management entities,
wherein the information is defined by a boot-lock variable having value equal to True.

11. The method of claim 10,
wherein the subscription management entity is associated only with a single mobile network operator; and
wherein the valid certificate is specific for the subscription management entity.

12. The method of claim 10,
wherein the subscription management entity is associated with at least two mobile network operators (MNOs); and
wherein the valid certificate is used by the subscription management entity for authenticating itself to the subscriber entity and is specific for only less than all of the at least two MNOs.

13. The method of claim 10,
wherein the enabling comprises providing a candidate certificate to the subscriber entity; and
wherein the subscription management entity is determined to possess the valid certificate only when the candidate certificate matches a reference certificate of the subscriber entity.

14. A subscriber entity for remote provisioning of the subscriber entity, the subscriber entity comprising:
processing circuitry; and
memory storing instructions that, when executed by the processing circuitry, causes the subscriber entity to:
provide a request for download of a profile for the remote provisioning of the subscriber entity to a subscription management entity;
verify, using a profile handling unit of the subscriber entity, that the subscription management entity possesses a valid certificate for downloading the profile,
wherein the verifying is performed in response to an Embedded Universal Integrated Circuit Card (eUICC) in the subscriber entity being locked to a particular set of mobile network operators and/or subscription management entities,
wherein information that the eUICC is locked to the particular set of mobile network operators and/or subscription management entities is defined by a boot-lock variable having value equal to True; and
allow the download of the profile for remote provisioning of the subscriber entity only when the subscription management entity possesses the valid certificate.

15. A subscription management entity for remote provisioning of a subscriber entity, the subscription management entity comprising:
processing circuitry; and
memory storing instructions that, when executed by the processing circuitry, causes the subscription management entity to:
receive a request for download of a profile for remote provisioning of the subscriber entity from the subscriber entity; and
enable a profile handling unit of the subscriber entity to verify that the subscription management entity possesses a valid certificate for downloading the profile,
wherein the request for the download comprises information that an Embedded Universal Integrated Circuit Card (eUICC) in the subscriber entity is locked to a particular set of mobile network operators and/or subscription management entities,
wherein the information is defined by a boot-lock variable having a value equal to True.

* * * * *